(12) United States Patent
True

(10) Patent No.: US 9,959,728 B2
(45) Date of Patent: May 1, 2018

(54) MANAGING A SMART APPLIANCE WITH A MOBILE DEVICE

(71) Applicant: INTERNATIONAL BUSINESS MACHINES CORPORATION, Armonk, NY (US)

(72) Inventor: Joseph A. True, Hudson, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 14/730,819

(22) Filed: Jun. 4, 2015

(65) Prior Publication Data

US 2016/0358443 A1 Dec. 8, 2016

(51) Int. Cl.
G08B 1/08 (2006.01)
G08B 21/02 (2006.01)
G08B 21/18 (2006.01)
H04W 4/12 (2009.01)

(52) U.S. Cl.
CPC ........... *G08B 21/02* (2013.01); *G08B 21/182* (2013.01); *H04W 4/12* (2013.01)

(58) Field of Classification Search
CPC ...... G08B 25/016; G08B 25/10; G08B 21/02; G08B 21/0446
USPC .................. 340/539.11, 12.28, 12.29, 12.54, 340/539.1–539.15
See application file for complete search history.

(56) References Cited

U.S. PATENT DOCUMENTS

| 5,608,378 A | 3/1997 | McLean et al. |
|---|---|---|
| 6,400,956 B1 * | 6/2002 | Richton .................. H04W 4/02 340/988 |
| 8,610,036 B2 | 12/2013 | Ewell, Jr. et al. |
| 8,638,232 B2 | 1/2014 | Olson et al. |
| 8,931,400 B1 * | 1/2015 | Allen ....................... H04Q 9/00 340/870.09 |
| 2005/0109333 A1 | 5/2005 | Thomas |
| 2006/0220834 A1 * | 10/2006 | Maeng ................... G08B 21/24 340/539.1 |
| 2008/0282902 A1 | 11/2008 | Dayton et al. |
| 2008/0291044 A1 * | 11/2008 | Chan .................. G08B 13/1427 340/686.6 |

(Continued)

FOREIGN PATENT DOCUMENTS

WO 98/28944 A1 7/1998

OTHER PUBLICATIONS

"Pittsburgh man modifies his toaster to tweet 'toasting' and 'done'", Jul. 26, 2013, UPI.com, found on the world wide web at: http://www.upi.com/Odd_News/2013/07/26/Pittsburgh-man-modifies-his-toaster-to-tweet-toasting-and-done/UPI-93181374873972/#ixzz2aRkswa8z.

(Continued)

*Primary Examiner* — George Bugg
*Assistant Examiner* — Sharmin Akhter
(74) *Attorney, Agent, or Firm* — Paul S. Drake

(57) ABSTRACT

A method, system or computer usable program product for a smart appliance to interact with a user through a mobile device including detecting whether a mobile device associated with a first user is outside a user configurable proximity range of a smart appliance; detecting a status of the smart appliance via a set of sensors; and responsive to detecting that the mobile device is outside the user configurable proximity range, sending a user configurable message to the mobile device associated with the first user including the status of the smart appliance.

20 Claims, 6 Drawing Sheets

(56) References Cited

U.S. PATENT DOCUMENTS

| | | |
|---|---|---|
| 2012/0132635 A1 | 5/2012 | Mishra |
| 2014/0128001 A1 | 5/2014 | Imes et al. |
| 2014/0251987 A1* | 9/2014 | Reay ................. F24C 7/088 |
| | | 219/756 |
| 2016/0174035 A1* | 6/2016 | Hughes ................. H04W 4/023 |
| | | 455/456.3 |

OTHER PUBLICATIONS

"Automatic Stove Turn-Off", 2010, thiscaringhome.com, found on the world wide web at: http://www.thiscaringhome.org/virtual_home/kitchen_stove_03-stove-shut-off-timers.aspx.

"Automatric Stove Turn-Off Devices", 2010, thiscaringhome.com, found on the world wide web at: http://www.thiscaringhome.org/products/auto-stove-turn-off-devices.php.

"How Smart Tech Will Take Care of Grandma", Feb. 4, 2014, Kiona Smith Strickland, found on the world wide web at: http://www.popularmechanics.com/science/health/a9958/how-smart-tech-will-take-care-of-grandma-16455410/.

"The Stove Sensor Can Prevent Unattended Cooking Fires", northwoodintouch.com, Jun. 2013, found on the world wide web at: http://northwoodintouch.com/wp-content/uploads/2013/06/Stove-Sensor-June2013-LoRes1.pdf.

"Motion Sensors What You Need to Know & Expert Reviews", Sep. 21, 2010, thiscaringhome.org, found on the world wide web at: https://web.archive.org/web/20100921012258/http://thiscaringhome.org/products/motion-sensors2.php.

"About the Fire Avert", Feb. 28, 2013, fireavert.com, found on the world wide web at: https://web.archive.org/web/20130228112123/http://www.fireavert.com/about-the-fire-avert/.

* cited by examiner

MANAGING A SMART APPLIANCE WITH A MOBILE DEVICE

TECHNICAL FIELD

The present invention relates generally to managing a smart appliance, and in particular, to a computer implemented method for managing a smart appliance with a mobile device.

DESCRIPTION OF RELATED ART

Many types of appliances are utilized today in homes and businesses for reducing workload for everyday chores and for improving the quality of life. However, these appliances are often left unattended for periods of time, particularly by those with medical or age induced conditions such as Alzheimer's disease. Some appliances may be hazardous if left unattended for extended periods of time or if they malfunction. For example, food being cooked may burn or boil over, a malfunctioning dryer may catch fire, etc. As a result, a variety of innovations have been developed to address these hazardous conditions. For example, an oven may turn off or provide an audio signal when a designated amount of time has lapsed, smoke alarms may be utilized to identify when a smoke inducing event has occurred and then provide an audio signal and/or send an alarm signal to a central alarm company, etc.

SUMMARY

The illustrative embodiments provide a method, system, and computer usable program product for a smart appliance to interact with a user through a mobile device including detecting whether a mobile device associated with a first user is outside a user configurable proximity range of a smart appliance; detecting a status of the smart appliance via a set of sensors; and responsive to detecting that the mobile device is outside the user configurable proximity range, sending a user configurable message to the mobile device associated with the first user including the status of the smart appliance.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Processes and devices may be implemented and utilized for managing a smart appliance with a mobile device. These processes and apparatuses may be implemented and utilized as will be explained with reference to the various embodiments below.

Figure 1:
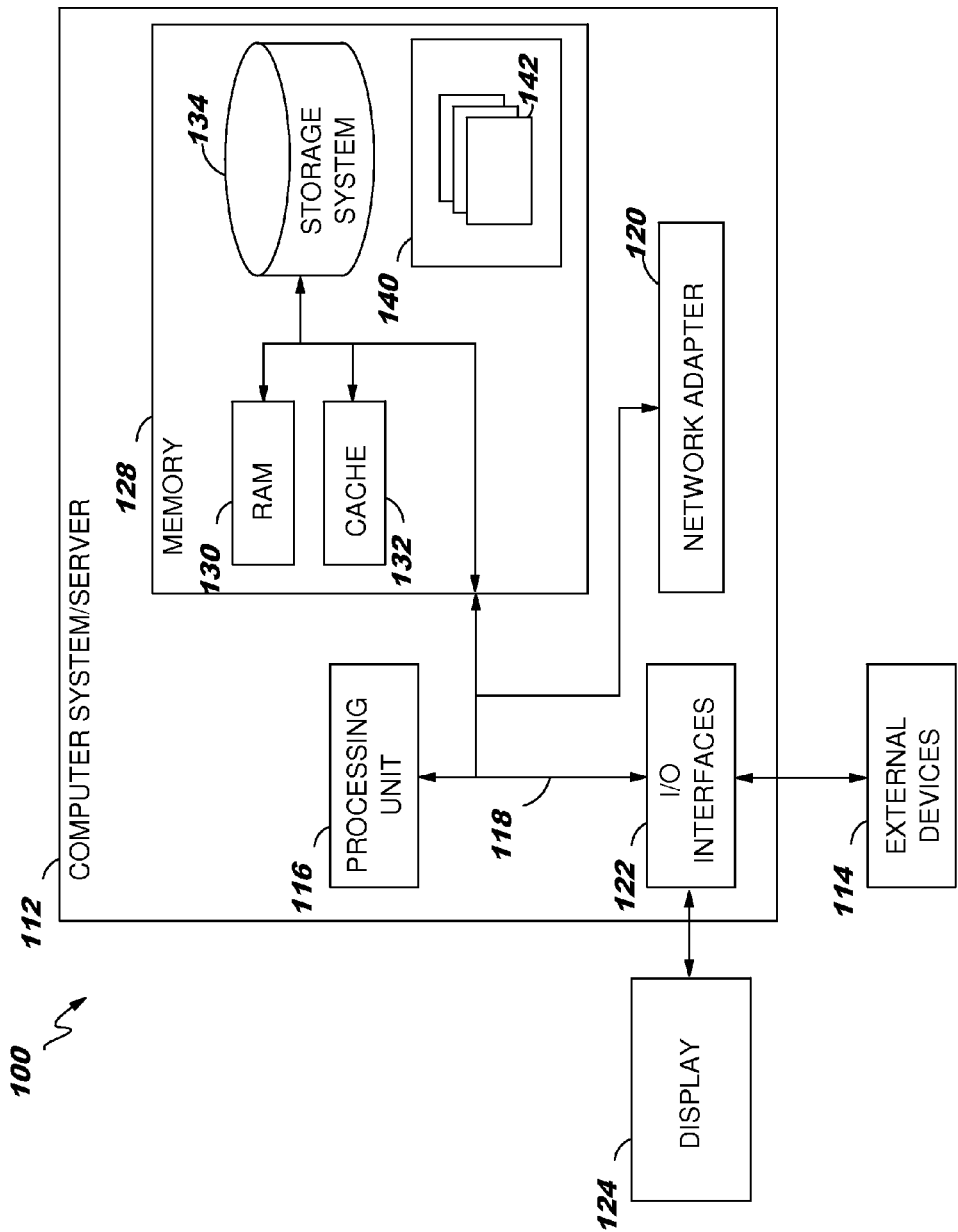
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as managing a smart appliance with a mobile device.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for managing a smart appliance with a mobile device. This program module may be an application (also referred to herein as an app) or other computer program implemented or loaded onto the smart appliance or the mobile device.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
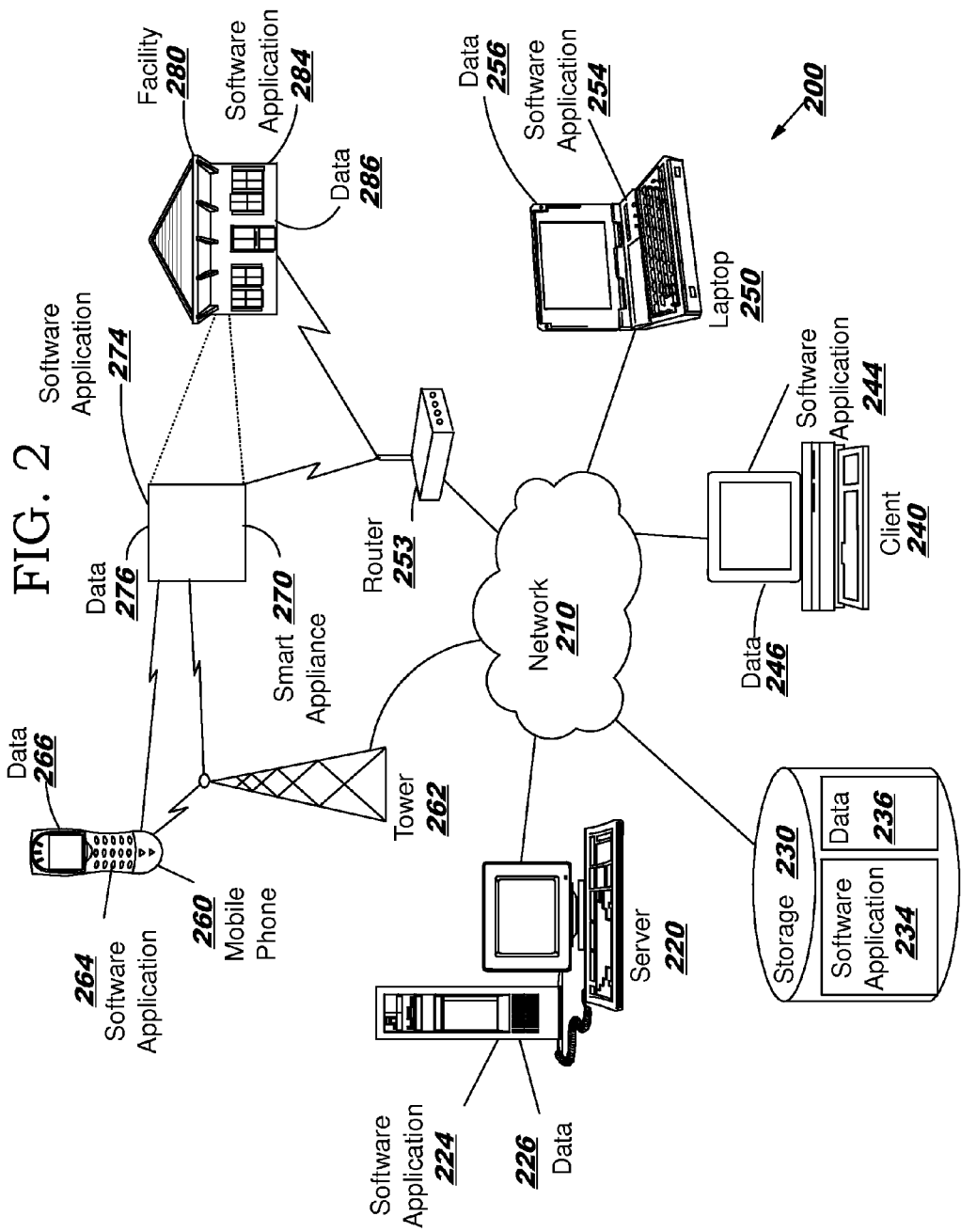
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for managing a smart appliance with a mobile device may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, smart appliance 270 and facility 280 (such as a home or business) are coupled to network 210 including wirelessly such as through a network router 253. A mobile device 260 and a smart appliance 270 may be coupled to network 210 through a mobile phone tower 262. Mobile device 260 is a communication device which can be associated with a user and can include a mobile phone, smartphone, personal digital assistant (PDA), wearable device (e.g., watch, glasses, bracelet, etc.), tablet, netbook, laptop, etc. Smart appliance 270 can include a device or piece of equipment with processing and communication capabilities designed to perform a specific task or tasks, typically domestic tasks. Smart appliance 270 can include a cooking appliance (e.g., oven, range, cooktop, toaster, toaster oven, countertop oven, microwave, countertop cooker, electric skillet, hot plate, slow cooker, coffee maker, expresso machine, etc.), a washing appliance (e.g., washer, dryer, dishwasher, etc.), mixing appliance (e.g., blender, mixer, food processor, etc.), food storage appliance (e.g., refrigerator, freezer, ice maker, etc.), ventilation appliances (cooktop fan, bathroom fan, etc.), food disposal appliances (e.g., trash compactor, garbage disposal, etc.), water treatment device (e.g., hot water heater, water filter, water softener, etc.), air treatment devices (air conditioning units, heaters, etc.) and other types of appliances. Some appliances can fall into multiple categories. For example, a bread maker is a mixing appliance and a cooking appliance and an ice cream maker is a mixing appliance and a short term food storage appliance. Smart appliance 270 may also be coupled directly and wirelessly with mobile device 260 such as through Bluetooth communications. Other groupings can be utilized such as heating appliances can include cooking appliances, water heaters and air heaters. Data processing systems, such as server 220, client 240, laptop 250, mobile device 260, smart appliance 270 and facility 280 contain data and have software applications including software tools executing thereon. Other types of data processing systems such as personal digital assistants (PDAs), mobile phone, smartphones, tablets and netbooks may be coupled to network 210.

Server 220 may include software application 224 and data 226 for managing a smart appliance with a mobile device or other software applications and data in accordance with embodiments described herein. Storage 230 may contain software application 234 and a content source such as data 236 for managing a smart appliance with a mobile device. Other software and content may be stored on storage 230 for sharing among various computer or other data processing devices. Client 240 may include software application 244 and data 246. Laptop 250 and mobile device 260 may also include software applications 254 and 264 and data 256 and 266. Smart appliance 270 and facility 280 may include software applications 274 and 284 as well as data 276 and 286. Other types of data processing systems coupled to network 210 may also include software applications. Software applications could include a web browser, email, or other software application for managing a smart appliance with a mobile device.

Server 220, storage unit 230, client 240, laptop 250, mobile device 260, smart appliance 270 and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile device 260, smart appliance 270 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
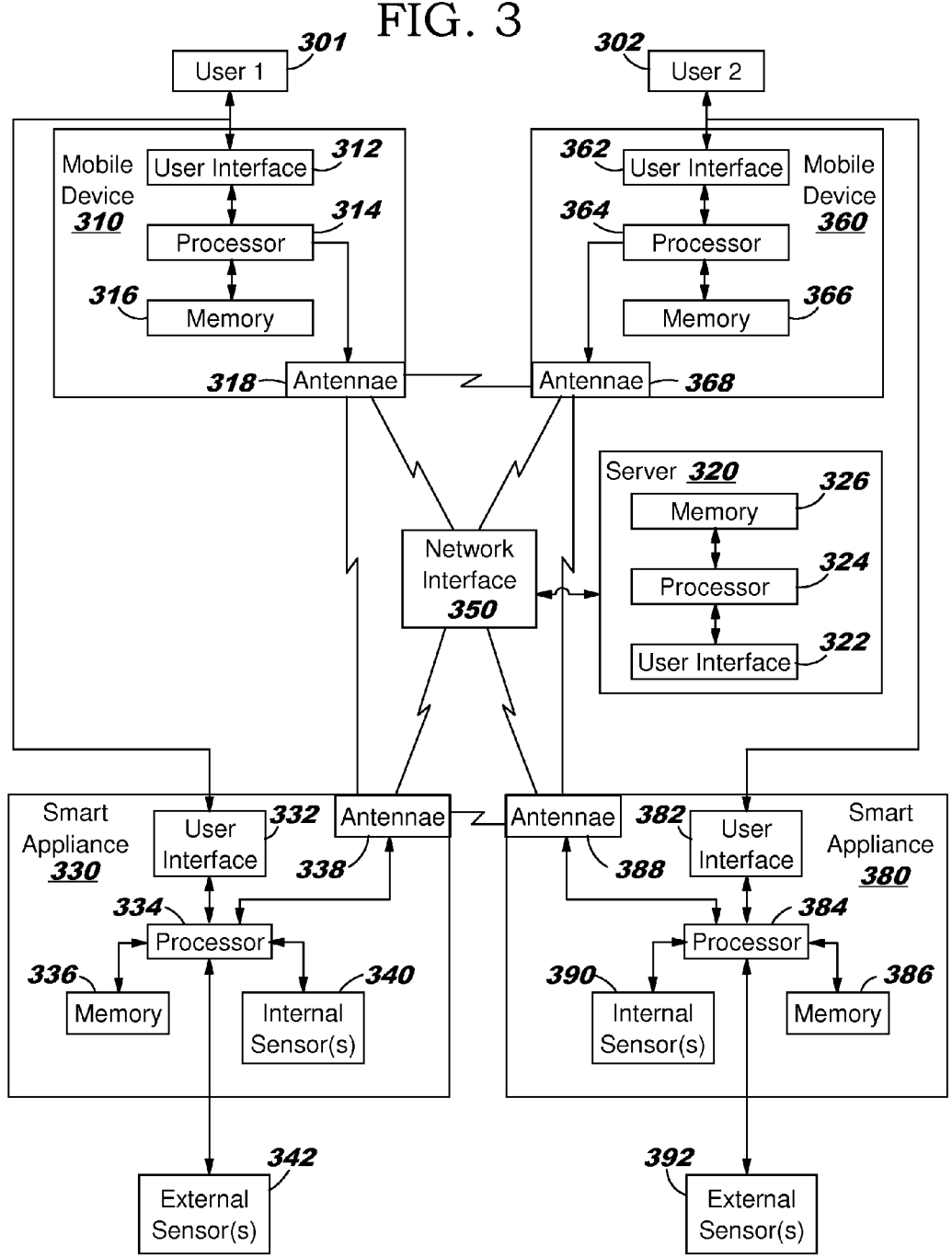
FIG. 3 is a block diagram of smart appliances interacting with users through mobile devices in which various embodiments may be implemented.

FIG. 3 is a block diagram of smart appliances interacting with users through mobile devices in which various embodiments may be implemented. A first user 301 interacts with a first mobile device 310 which communicates with a first smart appliance 330. First user 301 can also interact directly with smart appliance 330. In addition, a second user 302 interacts with a second mobile device 360 which communicates with a second smart appliance 380. Second user 302 can also interact directly with smart appliance 380. Each of the mobile devices and smart appliances can communicate with each other either directly (such as through a Bluetooth connection) or through a network interface 350 including server 320. Network interface 350 may be a local area network device, such as a Wi-Fi router, a remote network device such as a cellular tower, or other type of network interface.

First user 301 communicates with a processor 314 of mobile device 310 through a user interface 312. User interface 312 may include a display, a microphone and speaker, or other types of human interfaces. Processor 314 utilizes a memory 316 for storing an operating system, programs or applications (apps), and data such as device identifiers (IDs), user IDs, and user preferences. Processor also communicates with other devices including a network interface through antennae 318. Antennae 318 can include antennae for near field communications, local network communications, cellular communications, and other types of communications. Alternatively, mobile device 310 may utilize other types of communications with other devices such as infrared, optical, auditory, visual (e.g., through a display), etc.

Second user 302 communicates with a processor 364 of mobile device 360 through a user interface 362. User interface 362 may include a display, a microphone and speaker, or other types of human interfaces. User interface 362 can also include software, such as an application (also referred to as an app), or other computer program implemented on the mobile device. Processor 364 utilizes a memory 366 for storing an operating system, programs or applications (apps), and data such as device identifiers (IDs), user IDs, and user preferences. Processor also communicates with other devices through antennae 368. Antennae 368 can include antennae for near field communications, local network communications, cellular communications, and other types of communications. Alternatively, mobile device 360 may utilize other types of communications with other devices such as infrared, optical, auditory, visual (e.g., through a display), etc.

First user 301 can also communicate directly with a processor 334 of smart appliance 330 through a user interface 332. However, in some implementation, smart appliance may not have a user interface for human interaction and may require a mobile device for communicating with a user. User interface 332 may include a display, a microphone and speaker, or other types of human interfaces. Processor 334 utilizes a memory 336 for storing an operating system, programs, and data such as appliance identifiers (IDs), registered user and device IDs, and user preferences. Processor 334 also communicates with other devices including a network interface through antennae 338. Antennae 338 can include antennae for near field communications, local network communications, cellular communications, and other types of communications. Alternatively, smart appliance 330 may utilize with other types of communications with other devices such as infrared, optical, auditory, visual (e.g., through a display), etc. Smart appliance also communicates with internal (or local) sensors 340 for receiving information regarding the status of the operation of the smart appliance. Smart appliance 330 can also communicate with external (or remote) sensors 342 through antennae 332, either directly such as through a Bluetooth connection or indirectly such as through a local area network. External sensors may be sensors for other smart or non-smart appliances such as A/C humidity detectors. For example, if smart appliance 330 is a toaster, heat sensors could be utilized to detect temperature, optical sensors to detect the color of the item toasted, smoke sensors to detect burning toast, etc.

Second user 302 can also communicate directly with a processor 384 of smart appliance 380 through a user interface 382. However, in some implementation, smart appliance may not have a user interface for human interaction and may require a mobile device for communicating with a user. User interface 382 may include a display, a microphone and speaker, or other types of human interfaces. Processor 384 utilizes a memory 386 for storing an operating system, programs, and data such as appliance identifiers (IDs), registered user and device IDs, and user preferences. Processor 384 also communicates with other devices including a network interface through antennae 388. Antennae 388 can include antennae for near field communications, local network communications, cellular communications, and other types of communications. Alternatively, mobile device 380 may utilize other types of communications with other devices such as infrared, optical, auditory, visual (e.g., through a display), etc. Smart appliance also communicates with internal (or local) sensors 390 for receiving information regarding the status of the operation of the smart appliance. Smart appliance 380 can also communicate with external (or remote) sensors 392 through antennae 382, either directly such as through a Bluetooth connection or indirectly such as through a local area network. External sensors may be sensors for other smart or non-smart appliances such as smoke detectors. For example, if smart appliance 380 is a clothes dryer, heat sensors could be utilized to detect temperature, humidity sensors to detect dryness of the clothes, etc.

Server 320 can be a centralized server for multiple locations, a local server for one location, or a local dedicated device for assisting the interaction between users, mobile devices and smart appliances. Server 320 can include a user interface 322 for direct interaction of processor 324 with a user(s). Processor 324 can store in memory 326 a set of user preferences associated with a specific user(s) through a user ID and/or associated with a specific mobile device(s) through a device ID. Additional information can include the general location of the smart appliance(s) using global positioning system (GPS) or other coordinates, a list of smart appliances at a given location (household or business), etc.

Figure 4:
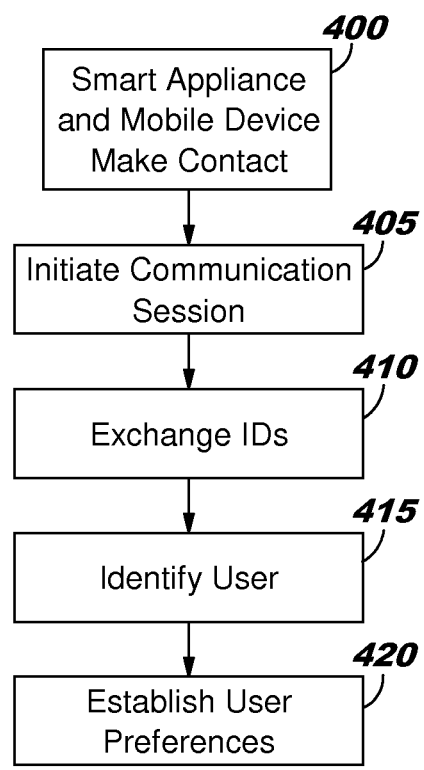
FIG. 4 is a flow diagram of registering a mobile device with a smart appliance in which various embodiments may be implemented.

FIG. 4 is a flow diagram of registering a mobile device with a smart appliance in which various embodiments may be implemented. This process provides information to a smart appliance for use as described below with the first and second embodiments. For example, information such as user preferences, a storage location of user preferences, mobile device and user contact information, etc. may be provided during this registration process. This registration process can be initiated during the loading of an application on a mobile device, when a smart appliance is installed, or at any time during the life of either device including anytime the smart appliance is turned on by the user for use. This process can be repeated with many different combinations of mobile devices with smart appliances.

In a first step 400, the mobile device contacts the smart appliance or vice versa, typically at the request of the user. This can be performed by direct or near contact with the other device or by addressing the other device using identifiers such as across a network. Then in step 405, a mobile device and smart device initiate a communication session. This communication session can be established locally such as through near field communications, Bluetooth, or other methods. This communication session can also be established remotely such as across the internet through a network interface. This communication session may be a secure or not depending on the implementation. Processing then continues to step 410.

In step 410, various identifiers are exchanged for establishing future communications. For example, if the mobile device is a mobile phone, the phone number of the phone may be provided to the smart appliance for sending a text to the mobile phone. In step 415, the user associated with the mobile device is identified. This user identifier may be a name, a number, biometric information, or other type of identifier. For example, if there are three users for a household that may utilize the device, then the users may be A, B and C with user A being associated with this mobile device. The user identifier may be provided by the user (e.g., John) through the mobile device or the mobile device may provide the user identifier. For example, the user may take a picture of him or herself to be used for facial or other biometric recognition. Because the user is generally understood to be carrying the mobile device (especially for wearable devices), identification of the mobile device will generally equate to recognizing the user and vice versa. The user identifier may simply be the mobile device identifier. Also, two users may be associated with a given mobile device. However, this may necessitate establishing the user of the mobile device when the smart appliance is turned on or given instructions to perform a task.

Then in step 420, user preferences are established. These may be standard user preferences provided by the smart appliance for possible modification by the user, previously established user preferences stored in the mobile device or server memory, etc. The user preferences may be downloaded or otherwise provided to the smart appliance, or a link to those user preferences stored elsewhere may be provided. If a link is provided, then the user can modify those user preferences without contacting the smart appliance. That is, when the smart appliance is turned on or given a task and a user identifier is provided, the smart appliance can then use the provided link to download the relevant user preferences for that user and smart appliance. User preferences are user configurable and can be utilized for a variety of purposes. For example, the user can provide or otherwise configure the circumstances when a status update message will be sent, the type of message sent, the amount of information provided with the message, proximity ranges to utilize in determining whether to send a message to a mobile device, etc. There can be a set of user configurable default user preferences for utilizing as needed and which the user can modify or not as the user desires. Processing can then continue to a task to be performed by the smart appliance or processing can cease until the smart appliance is turned on again or given a task to perform.

Figure 5:
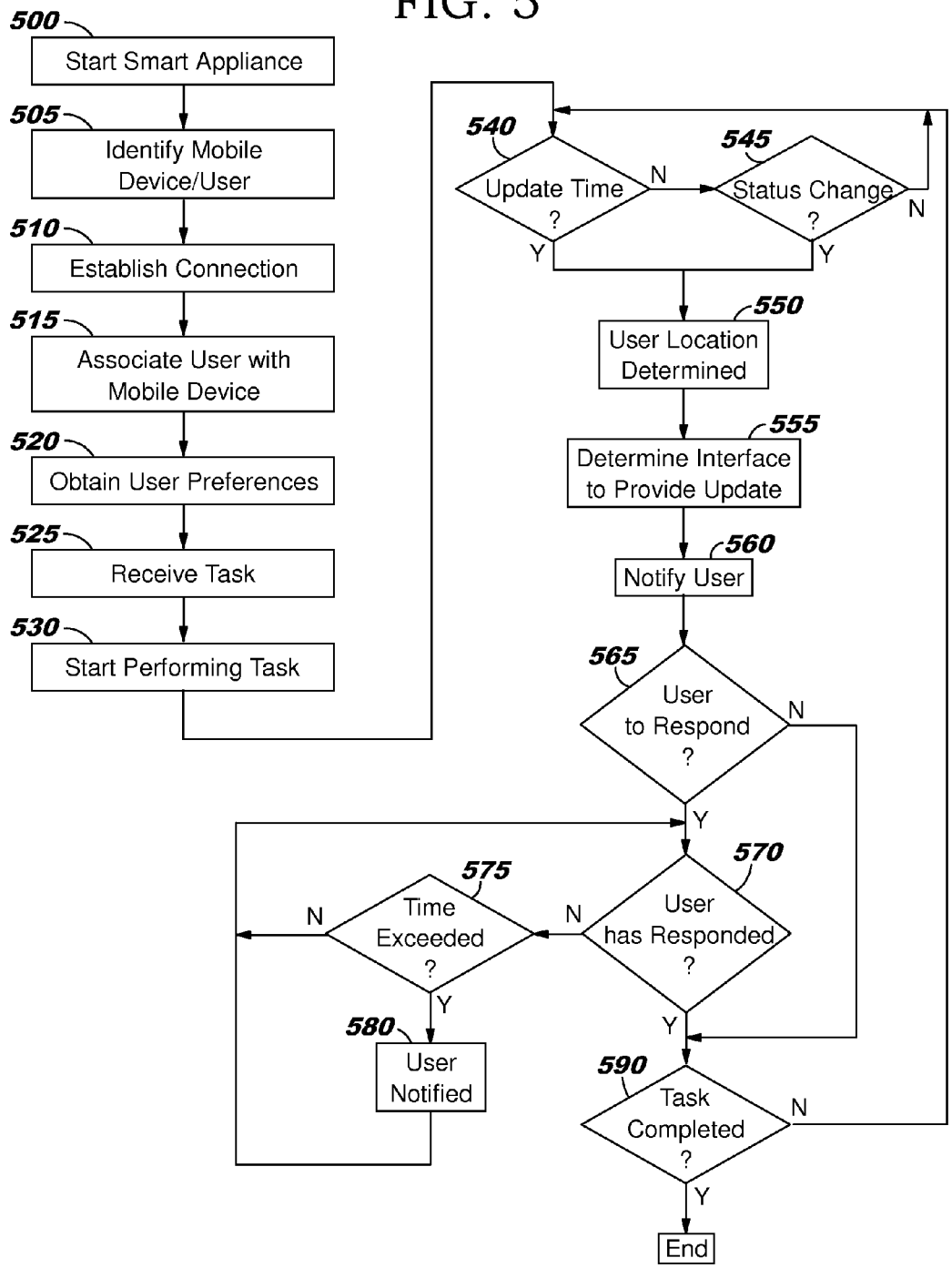
FIG. 5 is a flow diagram of a smart appliance performing a task in accordance with a first embodiment.

FIG. 5 is a flow diagram of a smart appliance performing a task in accordance with a first embodiment. In this embodiment, the smart appliance pushes various notifications to the user through the mobile device associated with that user in a push model. In this push model, notification can be sent by the smart appliance to the mobile device based on either status changes, timing intervals or other basis as may be indicated by user preferences. The type of user notifications (messages) can be based on the relative location of the user to the smart appliance as may be indicated by user preferences. In the second embodiment described below, the smart appliance responds to mobile device queries in a pull model.

In a first step 500, the smart appliance is started. It can be started by the user, by an internal timer, or by another smart appliance. For example, the user can manually press or select an on button or user entry input interface on the appliance (e.g., touch screen). The user can also send a signal to the smart device such as through an infrared remote or through a mobile device. An internal timer may be programmed to start the appliance at a certain time such as a coffee maker in the morning. The smart appliance may also be turned on by another appliance. For example, the user starts a smart pot on a range, so the smart pot may notify the range to turn on. Other types of starting the smart appliance may be utilized.

In a second step 505, a mobile device and the user associated with that mobile device is identified for establishing a communication link or other connection with the smart appliance. Typically, the user is associated with the mobile device most proximate to (e.g., closest to) the smart appliance when that appliance is started. Proximity is a closeness of a person (and/or his mobile device) to a smart appliance and is not necessarily based solely on distance. For example, a person in a room with a smart appliance may be further from that appliance than another person in an adjoining room. However, the person in the room may be considered most proximate. This proximity may be determined based on strength of Bluetooth signals, strength of connection with a local area network, global positioning signal (GPS) location, or other method for identifying proximity. For example, sensors such as video cameras with facial recognition may be utilized to identify the user most proximate to the appliance, which is then used to identify the mobile device associated with the user per the registration process described above. If the smart appliance determines that the user is not carrying the mobile device (e.g., the user enters the room as recognized by a video camera, yet the Bluetooth or wireless LAN determine the mobile device is located elsewhere), then the smart appliance could verbally or visually remind the user to carry the mobile device in order to obtain a more detailed status message from the smart appliance. Alternatively, the user and the user's mobile device may be identified as most proximate to the smart appliance if that mobile device is utilized to turn on the appliance or to provide a task for the appliance, regardless of the distance of the mobile device to the smart appliance. In another alternative, the user may be pre-identified. For example, there may be a single mobile device/user registered for the smart appliance or the user may be designated for the task selected for the appliance (e.g., toast lightly toasted may be user 1 and toast dark toasted may be user 2). In some cases, more than one mobile device and/or user may be identified. For example, for a given device, all mobile devices and their users within the facility may be identified for notifications, either concurrently or in sequence. If no mobile device is identified, then a default mobile device may be identified from memory, such as the last user of the smart appliance. In some cases, only a mobile device is identified at this point, with the user to be identified in the steps below.

In step 510, a connection is established between the identified mobile device and the smart appliance to enable upcoming communications. This connection may be direct, such as with a Bluetooth link, or indirect such as through a router, a cellular network, or across the internet. This connection may be a secure connection for secure communications, depending on the implementation, the location of the mobile device, and/or user preferences.

Then in step 515, if not already accomplished in step 505, an attempt is made to associate a user with the identified mobile device. For example, there may have been a mobile device most proximate to the smart appliance when that appliance was started. However, if that mobile device had not previously been registered with the smart appliance, then the user may not have been identified yet. As a result, a registration process may be initiated to accomplish that association. The location of the mobile device identified in this or the previous step can be stored and may be monitored by the smart appliance for future use as described below. If no user is identified, then processing can continue using default user preferences.

Then in step 520, user preferences for the identified user are obtained. These user preferences may be stored on the mobile device for downloading, stored in a server, a cloud implementation or other third party location, or stored in the smart appliance. If stored in the smart appliance, the user preferences may be uploaded to the mobile device. If there are no specified user preferences for the identified user, then default preferences may be utilized instead. The user preferences can then be utilized for implementing the notification process also referred to herein as status updates or messages.

In step 525, the smart appliance receives the task to be performed. This may be entered manually by the user through the smart appliance user interface, from the mobile device user interface and communicated to the appliance, or through another device such as a computer. The task could be any task that the smart appliance is designed to perform. For example, an air conditioning unit may be provided a desirable temperature and humidity, a toaster may receive a toast color request or a length of time to toast specification, etc. Then in step 530, the smart appliance starts performing the requested task.

Although the above steps are performed in a given sequence, those steps may be performed in an alternative order. For example, a user may manually start a smart appliance (step 500) and provide a task to be performed (step 525) through the user interface of that smart appliance prior to the mobile device and user being identified (steps 505 and 515), prior to establishing a connection with the mobile device (step 510), and prior to obtaining the user preferences (step 520). Other sequences can be utilized. Also, sometimes a task is ongoing and the user/mobile device to receive status updates may change. In these cases, the above steps can be performed mid-task.

In step 540, it is determined whether a scheduled time for providing a status update has occurred. For example, the user preferences may request a status update every two minutes. If yes, then processing continues to step 550, otherwise processing continues to returns to step 545.

In step 545, it is determined whether a status change has occurred that prompts a status update to the user as per the user preferences. The status change may be a task based status change by the smart appliance or a location based status change by the mobile device. The task based status change may prompt a status update to remind the user to perform an action. For example, that task based status change may be a change in status of a task being performed by the smart appliance, such as a temperature may have been reached in an oven so that the food to be cooked can be placed in the oven. The task based status change may prompt a status update to warn the user of a condition that needs attention. For example, a pot may boil over, food may burn, a water softener may need refilling, etc. The status change may also be in response to the user (and his or her mobile device) changing location. That location based status change may be the user leaving the room, leaving the facility, leaving the facility grounds, etc. For example, if a task is being performed and the user leaves the facility, the user may be reminded that the smart appliance is performing the task (e.g., the oven was left on cooking food). This status change can be detected by the phone and forwarded to the smart appliance, or it may be detected by the smart appliance through internal or external sensors. The types of location changes that are determined to be status changes can be set forth in the user preferences, as part of the smart appliance programming, as part of the mobile device programming, etc. If yes in step 545, then processing continues to step 550, otherwise processing returns to step 540. It is assumed that task completion would prompt a status update. If not, then an additional step may be implemented to shut down the appliance when the task is completed.

In step 550, the location of the user is identified and the relative location or proximity of the user to the smart appliance is determined. For example, the user may be in close proximity to the smart appliance, the user may be somewhat remote from the smart appliance while still in the same facility, or the user may be outside the facility and some distance from the smart appliance. The location of the user can be determined from facial or biometric recognition of the user or from the location of the mobile device associated with the user per the registration process described above. The mobile device location can be determined through several techniques such as strength of a Bluetooth signal from the mobile device, strength of connection with a local area network, from a GPS location provided by the mobile device, etc. This information can be utilized to determine whether the user or mobile device is within a proximate range to the smart appliance (e.g., the same room). The GPS location may be periodically provided by the mobile device to the smart appliance, it may be provided whenever the location of the mobile device changes more than some predetermined amount or from a predetermined location range, or it may be provided in response to a query from the smart appliance. The location of the mobile device may have been monitored continuously by the smart appliance since the task was initiated.

It is then determined in step 555 whether to provide a status update message through the smart appliance user interface, the mobile device user interface, or both interfaces. This determination can be made based on the location of the user or relative location of the user's mobile device to the smart appliance, the user preferences, and the type of status update. That is, it is determined whether the mobile device is within a user configurable proximity range of the smart appliance. The proximity range is based on proximity and is not necessarily based solely on distance. For example, the user may configure the proximity range to include the facility where the smart appliance is located but not outside the facility. As a result, a person in the facility with the smart appliance may be further from that appliance (but more proximate and within the user configured proximity range) than another person in the adjoining facility. For example, if the user is in the same room as the smart appliance, then an audible or visual signal or a combination of both may be performed to notify the user of the current status of the smart appliance. However, if the user is outside of the facility (and the user configurable range), then a status update may be provided to the user through the mobile device user interface. A user can specify that every status update or certain types of updates be provided through the mobile device user interface. For example, if the user is hearing impaired, then an audible or visual signal through the smart appliance user interface may not be noticed, necessitating a notification through the mobile device user interface (e.g., utilizing a vibration alert to bring attention to the status update). In an alternative embodiment, a message may be sent to the mobile device when the user enters the user configurable proximity range such as to provide a status of the smart appliance. Also, if the smart appliance is in an off, task completed, or other state the message may be suppressed. In addition, if the status update is a warning of a dangerous condition, then both the smart appliance and mobile device user interfaces may be utilized at the same time.

In step 560, the user is then notified of the status update of the smart appliance as determined in step 550. This status update can be in the form of an audible or visual signal, a text, and email, or other form of communication. In step 565, it is determined whether other actions should be taken should the user not respond to the status update. That is, it is determined whether the user needs to respond to the status update. For example, the hot water heater can detect a constant flow indicating a faucet is running when the user leaves the facility. If yes, then processing continues to step 570, otherwise processing continues to step 590.

In step 570, it is determined whether the user has responded to the status update requiring the user's response. If not, then processing continues to step 575, otherwise processing continues to step 590. In step 575, it is determined whether the time since the user has been notified has exceeded a predetermined time to respond. If not, then processing returns to step 570, otherwise continues to step 580. In step 580, the user is again notified of the status update, generally by both the smart appliance and mobile device user interfaces. Alternatively, another user(s) may be notified of the status update in place of or in addition to the current user. The other user may be notified based on user preferences, default parameters, or based on the type of status change (e.g., food is burning). Additionally, other users may be contacted concurrently or in series (i.e., a rollover process) as previous users do not respond. In addition, the smart appliance can also perform any additional steps, such as shutting down, based on the lack of response by the user. Processing then returns to step 570.

In step 590, it is determined whether the task has been completed including notification to the user if so required. If not, then processing returns to step 540, otherwise the smart appliance completes and task ending processes (e.g., turns off) and processing ceases.

Figure 6:
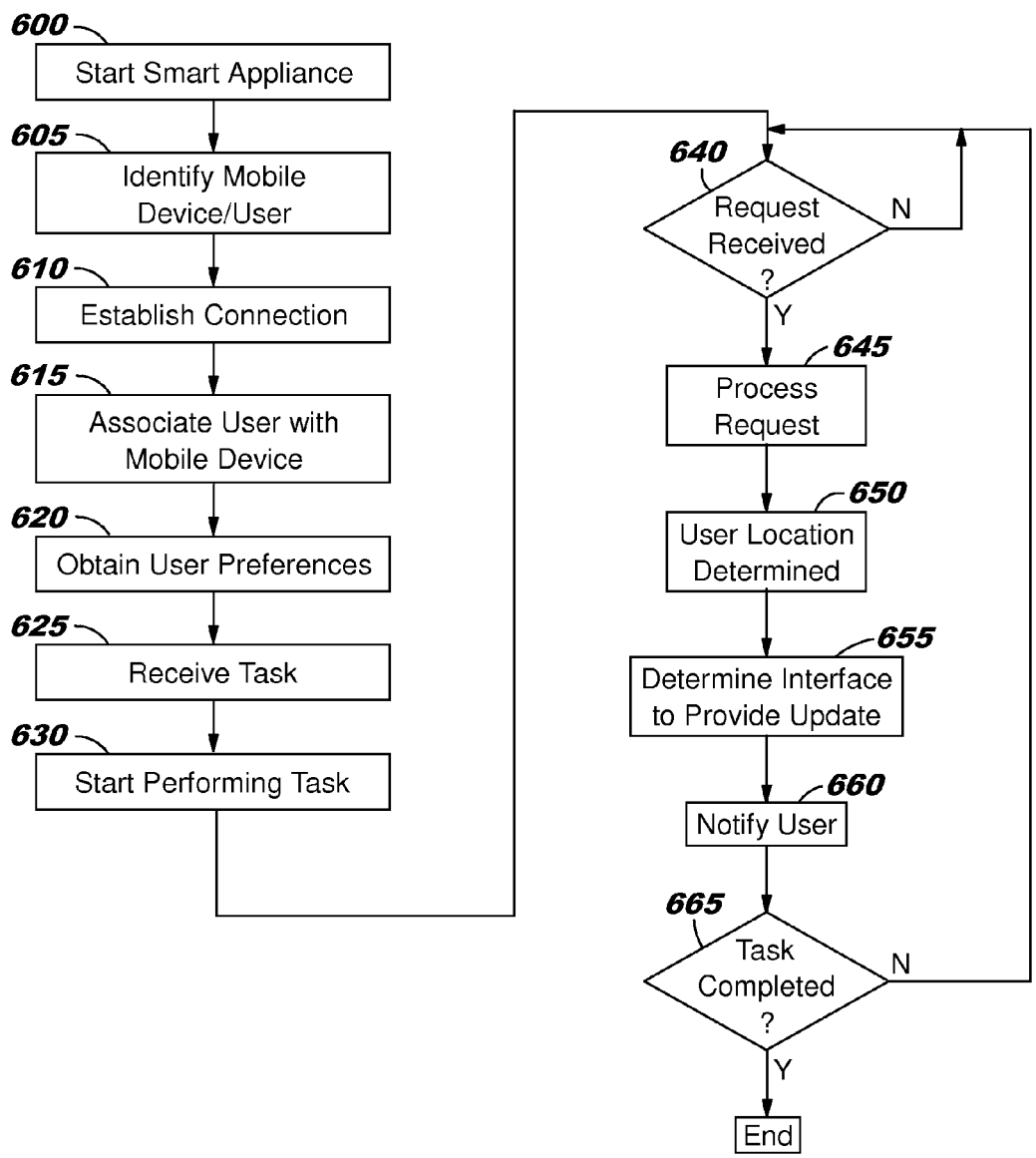
FIG. 6 is a flow diagram of a smart appliance performing a task in accordance with a second embodiment.

FIG. 6 is a flow diagram of a smart appliance performing a task in accordance with a second embodiment. In this embodiment, the smart appliance responds to mobile device queries in a pull model. In a first step 600, the smart appliance is started. It can be started by the user, by an internal timer, or by another smart appliance. For example, the user can manually press or select an on button or user entry input interface on the appliance (e.g., touch screen). The user can also send a signal to the smart device such as through an infrared remote or through a mobile device. An internal timer may be programmed to start the appliance at a certain time such as a coffee maker in the morning. The smart appliance may also be turned on by another appliance. For example, the user starts a smart pot on a range, so the smart pot may notify the range to turn on. Other types of starting the smart appliance may be utilized.

In a second step 605, a mobile device and the user associated with that mobile device is identified for establishing a communication link or other connection with the smart appliance. Typically, the user is associated with the mobile device most proximate to (e.g., closest to) the smart appliance when that appliance is started. Proximity is a closeness of a person (and/or his mobile device) to a smart appliance and is not necessarily based solely on distance. For example, a person in a room with a smart appliance may be further from that appliance than another person in an adjoining room. However, the person in the room may be considered most proximate. This proximity may be determined based on strength of Bluetooth signals, strength of connection with a local area network, global positioning signal (GPS) location, or other method for identifying proximity. For example, sensors such as video cameras with facial recognition may be utilized to identify the user most proximate to the appliance, which is then used to identify the mobile device associated with the user per the registration process described above. If the smart appliance determines that the user is not carrying the mobile device (e.g., the user enters the room as recognized by a video camera, yet the Bluetooth or wireless LAN determine the mobile device is located elsewhere), then the smart appliance could verbally or visually remind the user to carry the mobile device in order to obtain a more detailed status message from the smart appliance. Alternatively, the user and the user's mobile device may be identified as most proximate to the smart appliance if that mobile device is utilized to turn on the appliance or to provide a task for the appliance, regardless of the distance of the mobile device to the smart appliance. In another alternative, the user may be pre-identified. For example, there may be a single mobile device/user registered for the smart appliance or the user may be designated for the task selected for the appliance (e.g., toast lightly toasted may be user 1 and toast dark toasted may be user 2). In some cases, more than one mobile device and/or user may be identified. For example, for a given device, all mobile devices and their users within the facility may be identified for notifications, either concurrently or in sequence. If no mobile device is identified, then a default mobile device and user may be identified from memory, such as the last user of the smart appliance. In some cases, only a mobile device is identified at this point, with the user to be identified in the steps below.

In step 610, a connection is established between the identified mobile device and the smart appliance to enable upcoming communications. This connection may be direct, such as with a Bluetooth link, or indirect such as through a router, a cellular network, or across the internet. This connection may be a secure connection for secure communications, depending on the implementation, the location of the mobile device, and/or user preferences.

Then in step 615, if not already accomplished in step 605, an attempt is made to associate a user with the identified mobile device. For example, there may have been a mobile device most proximate to the smart appliance when that appliance was started. However, if that mobile device had not previously been registered with the smart appliance, then the user may not have been identified yet. As a result, a registration process may be initiated to accomplish that association. The location of the mobile device identified in this or the previous step can be stored and may be monitored by the smart appliance for future use as described below. If no user is identified, then processing can continue using default user preferences.

Then in step 620, user preferences for the identified user are obtained. These user preferences may be stored on the mobile device for downloading, stored in a server, a cloud implementation or other third part location, or stored in the smart appliance. If stored in the smart appliance, the user preferences may be uploaded to the mobile device. If there are no specified user preferences for the identified user, then default preferences may be utilized instead. The user preferences can then be utilized for implementing the notification process also referred to herein as status updates or messages.

In step 625, the smart appliance receives the task to be performed. This may be entered manually by the user through the smart appliance user interface, from the mobile device user interface and communicated to the appliance, or through another device such as a computer. The task could be any task that the smart appliance is designed to perform. For example, an air conditioning unit may be provided a desirable temperature and humidity, a toaster may receive a toast color request or a length of time to toast specification, etc. Then in step 630, the smart appliance starts performing the requested task.

Although the above steps are performed in a given sequence, those steps may be performed in an alternative order. For example, a user may manually start a smart appliance (step 600) and provide a task to be performed (step 625) through the user interface of that smart appliance prior to the mobile device and user being identified (steps 605 and 615), prior to establishing a connection with the mobile device (step 610), and prior to obtaining the user preferences (step 620). Other sequences can be utilized.

In step 640, it is determined whether a status update request has been received by the smart appliance. If not, then processing returns to step 640 to repeat until such a request is received. Otherwise, processing continues to step 645. In step 645, the smart appliance processes the request for a status update from the mobile device. That request may have been prompted by a location change of the mobile device, by a user request through the user interface on the mobile device, based on a scheduled time for a status update as tracked by the mobile device, or other basis. For example, the mobile device may request a status update whenever the user enters or exits the room where the appliance is located or when the mobile device shifts from a local area network connection to a cellular connection. For another example, the user may manually request a status update at any time through the mobile device user interface. For a further example, depending on the task requested of the smart appliance (such as by the user through the mobile device), the mobile device may request a status update when it is anticipated that a certain action by the user needs to be taken.

In step 650, the location of the user is identified and the relative location of the user to the smart appliance is determined. For example, the user may be in close proximity to the smart appliance, the user may be somewhat remote from the smart appliance while still in the same facility, or the user may be outside the facility and some distance from the smart appliance. The location of the user can be determined from facial or biometric recognition of the user or from the location of the mobile device associated with the user per the registration process described above. The mobile device location may have been provided in the status update request from the mobile device, or it can be determined through several techniques such as strength of a Bluetooth signal from the mobile device, strength of connection with a local area network, from a GPS location provided by the mobile device, etc. This information can be utilized to determine whether the user or mobile device is within a proximate range to the smart appliance (e.g., the same room). The GPS location may be periodically provided by the mobile device to the smart appliance, it may be provided whenever the location of the mobile device changes more than some predetermined amount or from a predetermined location range, or it may be provided in response to a query from the smart appliance. The location of the mobile device may have been monitored continuously by the smart appliance since the task was initiated.

It is then determined in step 655 whether to provide a status update through the smart appliance user interface, the mobile device user interface, or both interfaces. This determination can be made based on the location of the user or relative location of the user's mobile device to the smart appliance, the user preferences, and the type of status update. That is, it is determined whether the mobile device is within a user configurable proximity range of the smart appliance. The proximity range is based on proximity and is not necessarily based solely on distance. For example, the user may configure the proximity range to include anyone within Wi-Fi range of the facility's wireless router where the smart appliance is located. As a result, a person located outside the facility behind a thin wall may be further from that appliance (but more proximate and within the user configured proximity range) than another person on the other end of the facility and behind a thick internal wall. For example, if the user is in the same room as the smart appliance, then an audible or visual signal or a combination of both may be performed to notify the user of the current status of the smart appliance. However, if the user is outside of the facility (and the user configurable range), then a status update may be provided to the user through the mobile device user interface. A user can specify that every status update or certain types of updates be provided through the mobile device user interface. For example, if the user is hearing impaired, then an audible or visual signal through the smart appliance user interface may not be noticed, necessitating a notification through the mobile device user interface (e.g., utilizing a vibration alert to bring attention to the status update). In an alternative embodiment, a message may be sent to the mobile device when the user enters the user configurable proximity range such as to provide a status of the smart appliance. Also, if the smart appliance is in an off, task completed, or other state the message may be suppressed. In addition, if the status update is a warning of a dangerous condition, then both the smart appliance and mobile device user interfaces may be utilized at the same time.

In step 660, the user is then notified of the status update of the smart appliance as determined in step 650. This status update can be in the form of an audible or visual signal, a text, and email, or other form of communication. Then in step 665, it is determined whether the task has been completed including notification to the user if so required. If not, then processing returns to step 640, otherwise the smart appliance completes and task ending processes (e.g., turns off) and processing ceases.

Combinations of the first and second embodiments may be utilized. For example, certain status changes by the smart appliance may prompt a status update to the user, and location changes by the mobile device may prompt a status update query to the smart appliance. As described above, these status updates may be based on user preferences or predetermined programming within the smart appliance, the mobile device, or at a remote location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing a smart appliance with a mobile device. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for a smart appliance to interact with a user through a mobile device comprising:

receiving a set of user preferences from a first user including a user configurable proximity range from the smart appliance and including conditions for the smart appliance to send a status update to the first user through an associated mobile device;

detecting whether the mobile device associated with a first user is outside the user configurable proximity range of a smart appliance;

detecting a current status of the smart appliance by a set of sensors;

generating a user configurable message based, at least in part, upon the current status of the smart appliance;

responsive to detecting that the mobile device is outside the user configurable proximity range and detecting the conditions received in the set of user preferences, sending the user configurable message from the smart appliance to the mobile device associated with the first user including the current status of the smart appliance;

determining that the first user did not respond to the user configurable message; and responsive to the determination that the user did not respond, performing an action including notifying a second user of the user configurable message through a second mobile device associated with the second user.

2. The method of claim 1 wherein the action, performed in response to determining that the first user did not respond to the message, is based on the current status of the device.

3. The method of claim 1 further comprising determining whether to shut down the smart appliance in accordance with the set of user preferences if the first user does not respond to the user configurable message.

4. The method of claim 1 wherein a video camera with facial recognition is utilized for detecting the first user thereby identifying the mobile device associated with the first user.

5. The method of claim 1 wherein determining a geographic scope of the user configurable proximity range based, at least in part, upon at least one of the following:
  global positioning signal (GPS) location of the mobile device; and
  sensors identifying a location of any users associated with the mobile device.

6. The method of claim 1 wherein the smart appliance is a cooking device and the status includes a state of a food item being cooked by the smart appliance.

7. The method of claim 1 further comprising responsive to detecting that the mobile device is within the user configurable proximity range, sending a message to the user by the smart appliance.

8. The method of claim 1 wherein the set of sensors includes sensors in the smart appliance and external sensors coupled to a local network.

9. The method of claim 2 further comprising determining whether to provide a status update to the mobile device based on a status change; and responsive to detecting that the mobile device is within the user configurable proximity range, sending a message to the user by the smart appliance; wherein the status change includes a change in status of a task being performed by the smart appliance; wherein the status change includes a change in location of the mobile device;
  wherein the smart appliance is a cooking device and the status includes a state of a food item being cooked by the smart appliance; and wherein the set of sensors includes sensors in the smart appliance and external sensors coupled to a local network.

10. A computer program product for managing a smart appliance with a mobile device, the computer program product comprising a computer readable storage medium having program instructions embodied therewith, the program instructions executable by a processing circuit to cause the device to perform a method comprising:
  receiving a set of user preferences from a first user including a user configurable proximity range from the smart appliance and including conditions for the smart appliance to send a status update to the first user through an associated mobile device;
  detecting whether the mobile device associated with a first user is outside the user configurable proximity range of a smart appliance;
  detecting a current status of the smart appliance by a set of sensors;
  generating a user configurable message based, at least in part, upon the current status of the smart appliance;
  responsive to detecting that the mobile device is outside the user configurable proximity range and detecting the conditions received in the set of user preferences, sending the user configurable message from the smart appliance to the mobile device associated with the first user including the current status of the smart appliance;
  determining that the first user did not respond to the user configurable message; and
  responsive to the determination that the user did not respond, performing an action including notifying a second user of the user configurable message through a second mobile device associated with the second user.

11. The computer program product of claim 10 wherein the action, performed in response to determining that the first user did not respond to the message, is based on the current status of the device.

12. The computer program product of claim 10 further comprising determining whether to shut down the smart appliance in accordance with the set of user preferences if the first user does not respond to the user configurable message.

13. The computer program product of claim 10 wherein a video camera with facial recognition is utilized for detecting the first user thereby identifying the mobile device associated with the first user.

14. The computer program product of claim 10 wherein determining a geographic scope of the user configurable proximity range based, at least in part, upon at least one of the following:
  global positioning signal (GPS) location of the mobile device; and
  sensors identifying a location of any users associated with the mobile device.

15. The computer program product of claim 10 wherein the smart appliance is a cooking device and the status includes a state of a food item being cooked by the smart appliance.

16. A data processing system for managing a smart appliance with a mobile device, the data processing system comprising:
  a processor; and
  a memory storing program instructions which when executed by the processor execute the steps of:
  receiving a set of user preferences from a first user including a user configurable proximity range from the smart appliance and including conditions for the smart appliance to send a status update to the first user through an associated mobile device;
  detecting whether the mobile device associated with a first user is outside the user configurable proximity range of a smart appliance;
  detecting a current status of the smart appliance by a set of sensors;
  generating a user configurable message based, at least in part, upon the current status of the smart appliance;
  responsive to detecting that the mobile device is outside the user configurable proximity range and detecting the conditions received in the set of user preferences, sending the user configurable message from the smart appliance to the mobile device associated with the first user including the current status of the smart appliance;
  determining that the first user did not respond to the user configurable message; and
  responsive to the determination that the user did not respond, performing an action including notifying a second user of the user configurable message through a second mobile device associated with the second user.

17. The data processing system of claim 16 wherein the action, performed in response to determining that the first user did not respond to the message, is based on the current status of the device.

18. The data processing system of claim 16 further comprising determining whether to shut down the smart appliance in accordance with the set of user preferences if the first user does not respond to the user configurable message.

19. The data processing system of claim 16 wherein a video camera with facial recognition is utilized for detecting the first user thereby identifying the mobile device associated with the first user.

20. The data processing system of claim 16 wherein determining a geographic scope of the user configurable proximity range based, at least in part, upon at least one of the following:

global positioning signal (GPS) location of the mobile device; and
   sensors identifying a location of any users associated with the mobile device.

* * * * *